US011391384B2

(12) United States Patent
DeFusco

(10) Patent No.: US 11,391,384 B2
(45) Date of Patent: *Jul. 19, 2022

(54) HYDRAULIC ACTUATOR FORCE FIGHT MITIGATION MECHANISM

(71) Applicant: Sikorsky Aircraft Corporation, Stratford, CT (US)

(72) Inventor: David A. DeFusco, West Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 432 days.

This patent is subject to a terminal disclaimer.

(21) Appl. No.: 16/540,197

(22) Filed: Aug. 14, 2019

(65) Prior Publication Data

US 2020/0003314 A1 Jan. 2, 2020

Related U.S. Application Data

(63) Continuation of application No. 15/461,142, filed on Mar. 16, 2017, now Pat. No. 10,458,557.

(60) Provisional application No. 62/325,318, filed on Apr. 20, 2016.

(51) Int. Cl.
| F16K 11/16 | (2006.01) |
| B64C 27/64 | (2006.01) |
| B64C 13/42 | (2006.01) |
| B64C 27/605 | (2006.01) |
| F16K 31/08 | (2006.01) |

(52) U.S. Cl.
CPC ............ *F16K 11/161* (2013.01); *B64C 13/42* (2013.01); *B64C 27/605* (2013.01); *B64C 27/64* (2013.01); *F16K 31/082* (2013.01)

(58) Field of Classification Search
CPC ....... B64C 13/42; B64C 27/64; F16K 11/161; F16K 31/0603; F16K 31/061; F16K 31/0613; F16K 31/0617; F15B 2211/8757
See application file for complete search history.

(56) References Cited

U.S. PATENT DOCUMENTS

| 2,951,342 | A | * | 9/1960 | Lundeen | ................. | B23Q 35/12 |
| | | | | | | 91/183 |
| 3,269,676 | A | * | 8/1966 | Hopkins | ................. | B64C 13/42 |
| | | | | | | 244/78.1 |
| 3,338,138 | A | | 8/1967 | Wood | | |
| 3,338,139 | A | | 8/1967 | Wood | | |
| 3,527,143 | A | | 9/1970 | Hayter | | |
| 3,543,641 | A | | 12/1970 | DePlante | | |
| 3,580,139 | A | | 5/1971 | Rasmussen | | |
| 3,580,281 | A | | 5/1971 | Petersen | | |

(Continued)

FOREIGN PATENT DOCUMENTS

GB 2243669 A * 11/1991 ............. F16D 43/04

*Primary Examiner* — Joseph W Sanderson
(74) *Attorney, Agent, or Firm* — Michael Best & Friedrich LLP

(57) ABSTRACT

A control valve for a multi-stage hydraulic actuator includes a valve body defining a translation axis, a spool disposed within the valve body and movable along the translation axis, and a flange. The flange is fixed relative to the spool and has an aperture disposed externally of the valve body to removably fix the spool to a spool of a redundant control valve independently connected to the multi-stage hydraulic actuator for mitigating force fights between actuators coupled to the control valve.

20 Claims, 4 Drawing Sheets

(56) References Cited

U.S. PATENT DOCUMENTS

| | | | |
|---|---|---|---|
| 3,790,129 A * | 2/1974 | Pauls | F16K 31/0613 |
| | | | 251/297 |
| 3,837,262 A | 9/1974 | Hedermann | |
| 3,933,176 A | 1/1976 | Wheeler | |
| 4,057,004 A | 11/1977 | Kamimura | |
| 4,601,169 A | 7/1986 | Hesse et al. | |
| 6,981,439 B2 | 1/2006 | Hart | |
| 7,397,209 B2 | 7/2008 | Hirai | |
| 7,828,245 B2 | 11/2010 | Suisse et al. | |
| 7,882,778 B2 * | 2/2011 | Fenny | H03C 1/34 |
| | | | 91/509 |
| 8,336,579 B2 * | 12/2012 | Le Devehat | F16L 29/002 |
| | | | 137/614.06 |
| 9,470,248 B2 | 10/2016 | Paulmann | |
| 10,458,557 B2 * | 10/2019 | DeFusco | B64C 27/605 |
| 2005/0132877 A1 * | 6/2005 | Hart | F15B 18/00 |
| | | | 91/509 |
| 2006/0289073 A1 * | 12/2006 | Biener | F16K 31/408 |
| | | | 137/630.13 |
| 2015/0075149 A1 | 3/2015 | Paulmann | |

* cited by examiner

HYDRAULIC ACTUATOR FORCE FIGHT MITIGATION MECHANISM

CROSS-REFERENCE TO RELATED APPLICATION

This application is a continuation of U.S. Non-Provisional Application Ser. No. 15/461,142 filed on Mar. 16, 2017, which claims the benefit of priority under 35 U.S.C. § 119(e) to U.S. Provisional Application No. 62/325,318, filed Apr. 20, 2016, both of which are incorporated herein by reference in their entirety.

BACKGROUND OF THE INVENTION

1. Field of the Invention

The present disclosure relates to the control of hydraulic actuators, and more particularly to the control of hydraulic actuators with redundant fluid sources.

2. Description of Related Art

Rotorcraft like helicopters flight control devices that are actuated by hydraulically driven actuators. In some rotorcraft the actuators are redundantly provided with pressurized fluid from more than one hydraulic system. Servo devices generally regulate flow from both systems to each chamber of the actuator when one or multiple hydraulic systems are available to provide pressurized hydraulic fluid. The servo devices convert electrical current into mechanical valve motion in order to port hydraulic fluid between and extend and retract chambers of the actuator. Such servo devices generally provide coordinated flow from each of the hydraulic systems based on force applied to a throttling element disposed within the servo device.

One challenge to such arrangements is that force flight cycles can develop within the servo device. Force flight cycles develop when the regulation of fluid flow between the hydraulic systems becomes uncoordinated, typically because one flow-regulating element moves out of tandem with another element. Such force fight events can be the result of manufacturing variability within the servo device or commands arriving out of phase with one another. Servo-controlled hydraulic actuators therefore typically include added structural margin and/or additional sensors and control algorithms to manage the magnitude of the force fight.

Such conventional methods and systems have generally been considered satisfactory for their intended purpose. However, there is still a need in the art for improved hydraulic actuators. The present disclosure provides a solution for this need.

SUMMARY OF THE INVENTION

A control valve for a multiple stage hydraulic actuator includes a valve body defining a translation axis, a spool disposed within the valve body and movable along the translation axis, and a flange. The flange has an aperture that is disposed externally of the valve body and is fixed relative to the spool to removably fix the spool to a spool of a redundant control valve that is independently connected to the multiple stage hydraulic actuator.

In certain embodiments, the spool and the flange can be integral with one another. The spool and the flange can be a unitary structure. The flange aperture can be a through hole or a blind hole. A seal can be disposed between the flange and the spool to fluidly isolate hydraulic fluid within the valve body from the environment external to the valve body. A rail can be fixed relative to the valve body. The rail can extend along the translation axis. The rail can be offset laterally relative to the translation axis. A tandem pin defining a pin axis can be seated within the flange aperture. The tandem pin can be displaceable along the pin axis. The tandem pin can be coupled to the rail. The tandem pin can be translatable along the rail axially along the translation axis. The pin axis can be angled relative to the translation axis, such as at an oblique angle or a 90-degree angle. A solenoid or linear motor can be coupled to the tandem pin to displace the tandem pin along the pin axis.

In accordance with certain embodiments, the spool can be a first spool and the control valve can include a second spool. The second spool can be disposed along the translation axis. The second spool can have a flange that overlaps the flange of the first spool. The aperture of the second flange can define an aperture. The second aperture can be a through hole or a blind hole to receive the tandem pin. Either or both of the spools can be disposed within valve bodies of first and second infinitely variable directional valves. The first valve body can be fixed to the second valve body. The first valve body can be fluidly coupled between a primary hydraulic system and a hydraulic actuator. The second valve body can be fluidly coupled between a secondary hydraulic system and the hydraulic actuator through an independent fluid conduit.

It is also contemplated that, in accordance with certain embodiments, the first flange can be interposed between the first spool and the second spool along the translation axis. The second flange can be interposed between the first spool and the second spool along the translation axis. The tandem pin can have an engaged position and a disengaged position. The solenoid or linear motor can be operatively connected to the tandem pin to displace the tandem pin along the pin axis between the engaged position and the disengaged position. In the engaged position the tandem pin is fixed relative to both the first flange and the second flange. In the disengaged position the tandem pin is fixed to only one of the first flange and the second flange.

A hydraulic actuator assembly includes a hydraulic actuator and two or more control valves as described above. The control valves are in fluid communication with the hydraulic actuator through independent fluid conduits. The valve body of the first control valve is fixed relative to the valve body of the second control valve. The flange of the first control valve overlaps the flange of the second control valve, and a tandem pin is seated in at least the first flange aperture to prevent control valve force fights and provide flow redundancy by synchronizing translation of the flanges and valve spools along the translation axis.

A rotorcraft includes a flight control device, a hydraulic actuator operably connected to the flight control device, and a control valve assembly as described above. A solenoid or linear motor is carried by the flange of the first control valve flange, and the solenoid or linear motor electromagnetically coupled to the tandem pin to displace the tandem pin between the engaged and disengaged positions.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
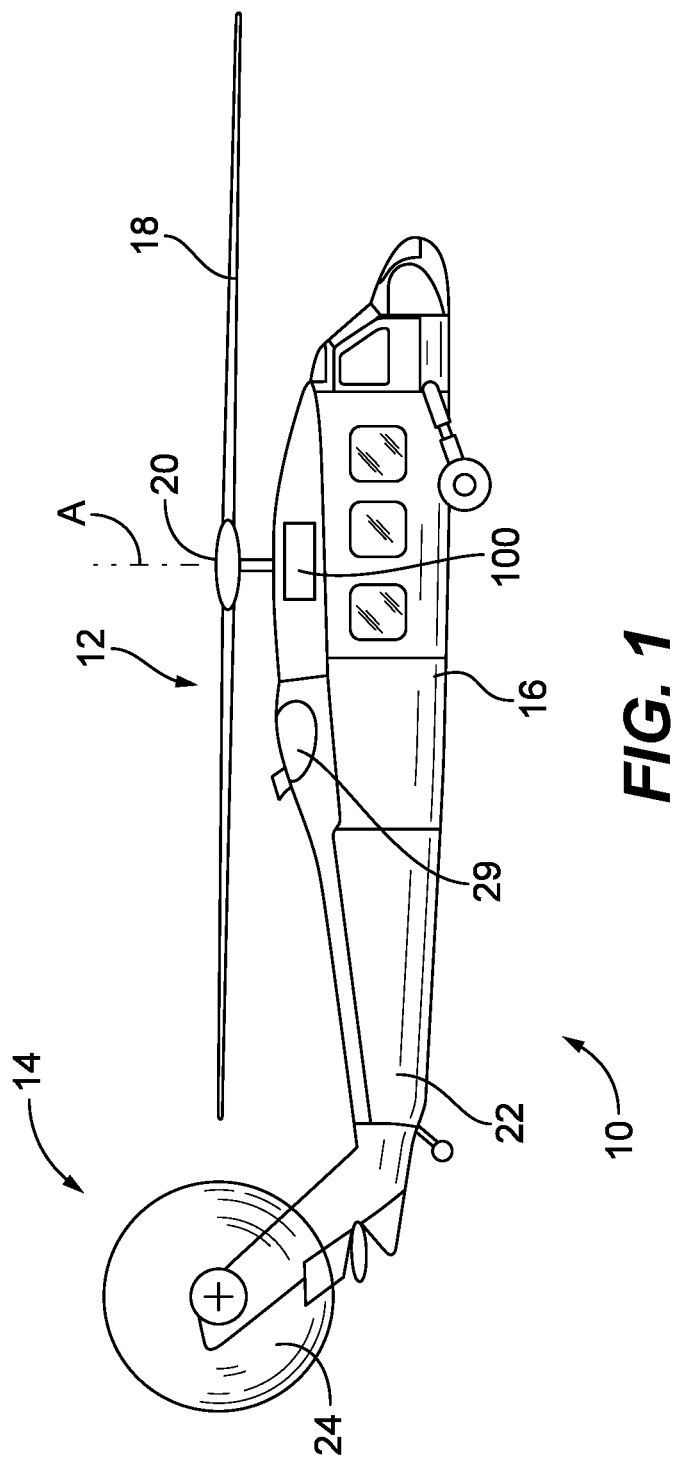
FIG. 1 is a schematic view of an exemplary embodiment of a rotorcraft, showing a control valve assembly for a hydraulic actuator.

Reference will now be made to the drawings wherein like reference numerals identify similar structural features or aspects of the subject disclosure. For purposes of explanation and illustration, and not limitation, a partial view of an exemplary embodiment of a control valve for a hydraulically actuated flight control device is shown in FIG. 1 and is designated generally by reference character 100. Other embodiments of control valves, control valve assemblies, and rotorcraft including such control valves, or aspects thereof, are provided in FIGS. 2-4, as will be described. The systems and methods described herein can be used in rotorcraft; however the present disclosure is not limited to flight control device actuators or to aircraft in general.

Referring to FIG. 1, rotorcraft 10 is shown. Rotorcraft 10 includes a main rotor system 12 and an anti-torque system, for example, a tail rotor system 14. Main rotor system 12 is supported for rotation about a main rotor axis A by an airframe 16 of rotorcraft 10 and includes a plurality of main rotor blades 18. Main rotor blades 18 are connected to a swashplate assembly hub 20 and are supported by airframe 16 for rotation about main rotor axis A. Tail rotor system 14 is supported by a longitudinally extending tail 22 and includes a plurality of tail rotor blades 24 supported for rotation relative to longitudinally extending tail 22. Main rotor system 12 and tail rotor system 14 rotatably driven by one or more turbine engines 29 carried by airframe 16, thereby providing lift and thrust to rotorcraft 10. Control valve assembly 100 is carried by airframe 16 and is operatively connected to swash plate assembly 20.

Figure 2:
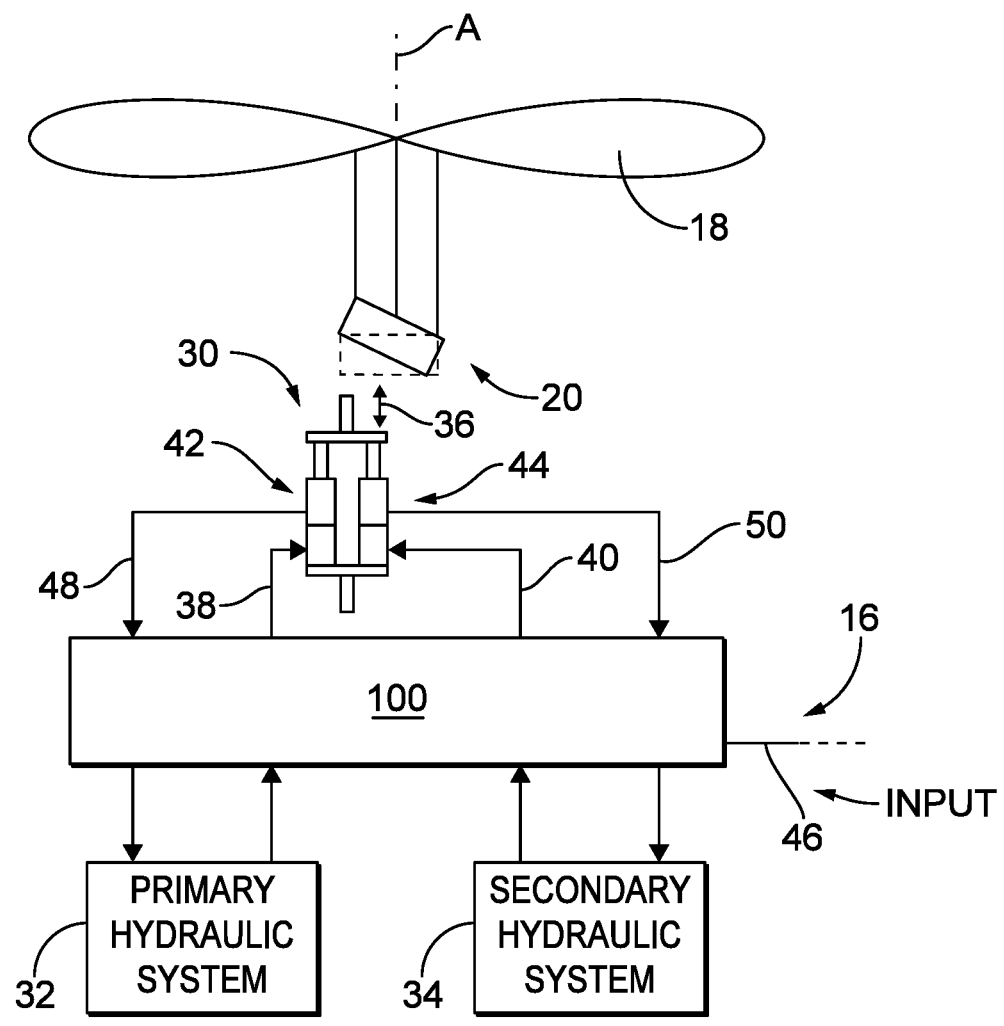
FIG. 2 is a schematic view of the rotorcraft of FIG. 1, showing a hydraulic actuator operably connected to a flight control device and in fluid communication with the control valve assembly.

With reference to FIG. 2, rotorcraft 10 is shown schematically. Airframe 16 carries a multi-stage hydraulic actuator 30, a primary hydraulic system 32, and a secondary hydraulic system 34. Multi-stage hydraulic actuator 30 is operably connected to main rotor system 12 through swash plate assembly 20 and is configured to change a position of a flight control device included in main rotor system 12 by applying an actuation force 36 thereto. In the illustrated exemplary embodiment, multi-stage hydraulic actuator 30 is operably connected to a swashplate assembly of main rotor system and is configured to change an angle defined between rotation axis A and the swashplate, which then changes the rotation pitch of main rotor blades 18. Although multi-stage hydraulic actuator 30 is illustrated as coupled to two hydraulic systems, it is to be appreciated and understood that more that multi-stage hydraulic actuator can be coupled to more than two hydraulic systems.

Primary hydraulic system 32 is in fluid communication with a primary stage 42 of multi-stage hydraulic actuator 30 and is configured to provide a flow of pressurized hydraulic fluid thereto for driving multi-stage hydraulic actuator 30. Secondary hydraulic system 34 is in fluid communication with a secondary stage 44 of multi-stage hydraulic actuator 30 and is configured to provide a flow of hydraulic fluid to multi-stage hydraulic actuator 30. Control valve assembly 100 is interposed between both primary hydraulic system 32 and secondary hydraulic system 34 and is configured to provide hydraulic fluid to multi-stage hydraulic actuator 30 through a primary extend conduit 38 and an independent secondary extend conduit 40. Flow from control valve assembly 100 is controlled through an input, which may be a throttling command issued from flight control input device. In certain embodiments, a flight control computer may be operatively connected to control valve assembly 100 through a fly-by-wire system 46.

Figure 3:
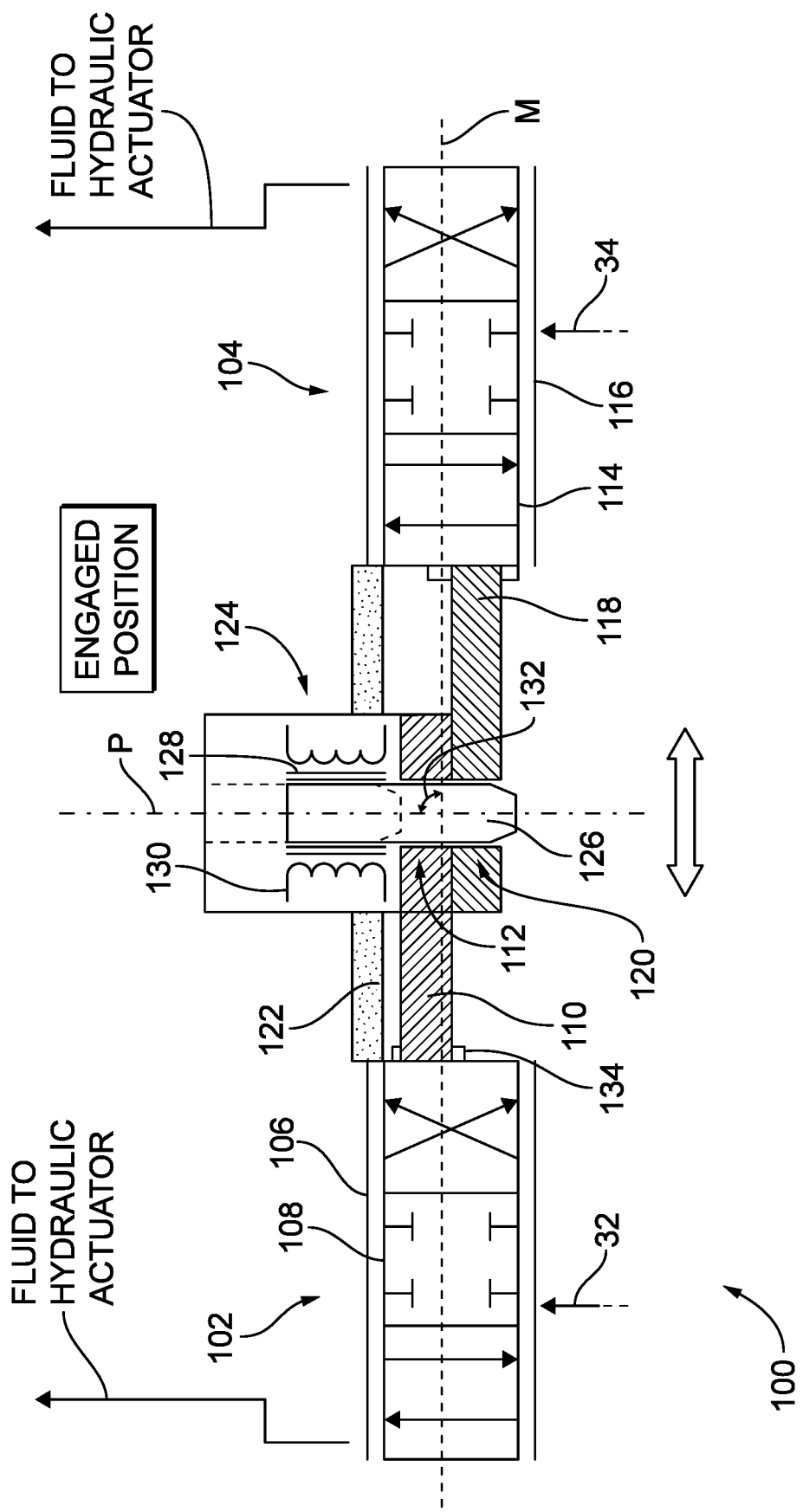
FIG. 3 is a schematic diagram of control valve assembly of FIG. 1, showing a tandem pin seated in an engaged position and seated flanges of first and second control valves for tandem operation of the control valves.

With reference to FIG. 3, control valve assembly 100 is shown. Control valve assembly 100 includes a first control valve 102 and a second control valve 104. In the illustrated exemplary embodiment, both first control valve 102 and second control valve 104 are infinitely variable directional valves.

First control valve 102 includes a first valve body 106, a first spool 108, and a first flange 110. First valve body 106 is fluidly coupled between primary hydraulic system 32 and swash plate assembly 20 (shown in FIG. 2), and defines a translation axis M. First spool 108 is slideably received within first valve body 106 and movable along movement M to regulate the flow of pressurized fluid between primary extend conduit 38 (shown in FIG. 2) and primary retract conduit 48 (shown in FIG. 2) from primary hydraulic system 32. First flange 110 is fixed to first spool 108, defines a first flange aperture 112, and is movable along translation axis M between first and second positions in tandem with first spool 108. In the illustrated exemplary embodiment first spool 108 and first flange 110 are integral with one another and form a unitary structure, thereby simplifying assembly. A seal 134 is disposed between first flange 110 and first spool 108 to fluidly isolate hydraulic fluid (shown with flow arrows in FIG. 3) within first valve body 106 from the environment external to first valve body 106.

Second control valve 104 is similar in arrangement to first control valve 102 and additionally includes a second flange 118 underlying (relative to the top of FIG. 3) first flange 110. Second flange 118 defines a second aperture 120 and is fixed relative to second spool 114. Second spool 114 is slideably received within a second valve body 116 and is movable along movement M to regulate the flow of pressurized hydraulic fluid between secondary extend conduit 40 (shown in FIG. 2) and secondary retract conduit 50 (shown in FIG. 2) from secondary hydraulic system 34.

A rail 122 is fixed relative to first valve body 106 and second valve body 116, extends along translation axis M, and is offset laterally from translation axis M. In the illustrated exemplary embodiment rail 122 is fixed to both first valve body 106 and second valve body 116, extends between the valve bodies, and overlays both first flange 110 and second flange 118.

A solenoid or linear motor 124 is fixed relative to first flange 110 and is translatable along translation axis M in tandem with first spool 108. Rail 122 is configured to carry the weight and dynamic load of solenoid or linear motor 124 throughout its movement range along translation axis M. Solenoid or linear motor 124 includes a tandem pin 126, a permanent magnet 128, and a coil 130. Coil 130 fixed relative to first flange 110 and is selectively connected to a power source (not shown for clarity reasons) and generates an electromotive force upon application of current thereto. Permanent magnet 128 is fixed relative to tandem pin 126 and is electromagnetically coupled to coil 130.

Tandem pin 126 defines a pin axis P. Pin axis P is angled relative to translation axis M at an angle 132. In the illustrated exemplary embodiment angle 132 is a 90-degree angle, however it is contemplated that angle 132 may be an oblique angle to facilitate integration of control valve assembly 100 in a given envelope. Tandem pin 126 is movable between an engaged position (shown in FIG. 3) and a disengaged position (shown in FIG. 4).

In the engaged position tandem pin 126 is slideably seated within both first flange aperture 112 and second flange aperture 120. Seating tandem pin 126 in first flange aperture 112 and second flange aperture 120 couples first flange 110 with second flange 118 such that first spool 108 and second spool 114 move in tandem with one another, as indicated by the single arrow shown in FIG. 3. As will be appreciated by those of skill in the art in view of the present disclosure, coupling first flange 110 with second flange 118 with tandem pin 126 causes the flanges and spools of the control valves to move in tandem with one another along translation axis M, preventing one spool from moving relative to one another, reducing (or eliminating) the possibility of cyclical force fights from initiating between the coupled control valves provide flow redundancy by synchronizing translation of the first flange 110 and second flange 118, and thereby first spool 108 and second spool 114, along translation axis M. It is contemplated that the apertures of the flanges can be coaxial with one another in a flow-matches configuration, accommodating manufacturing variation, which may be present in either (or both), of first control valve 102 and second control valve 104.

Figure 4:
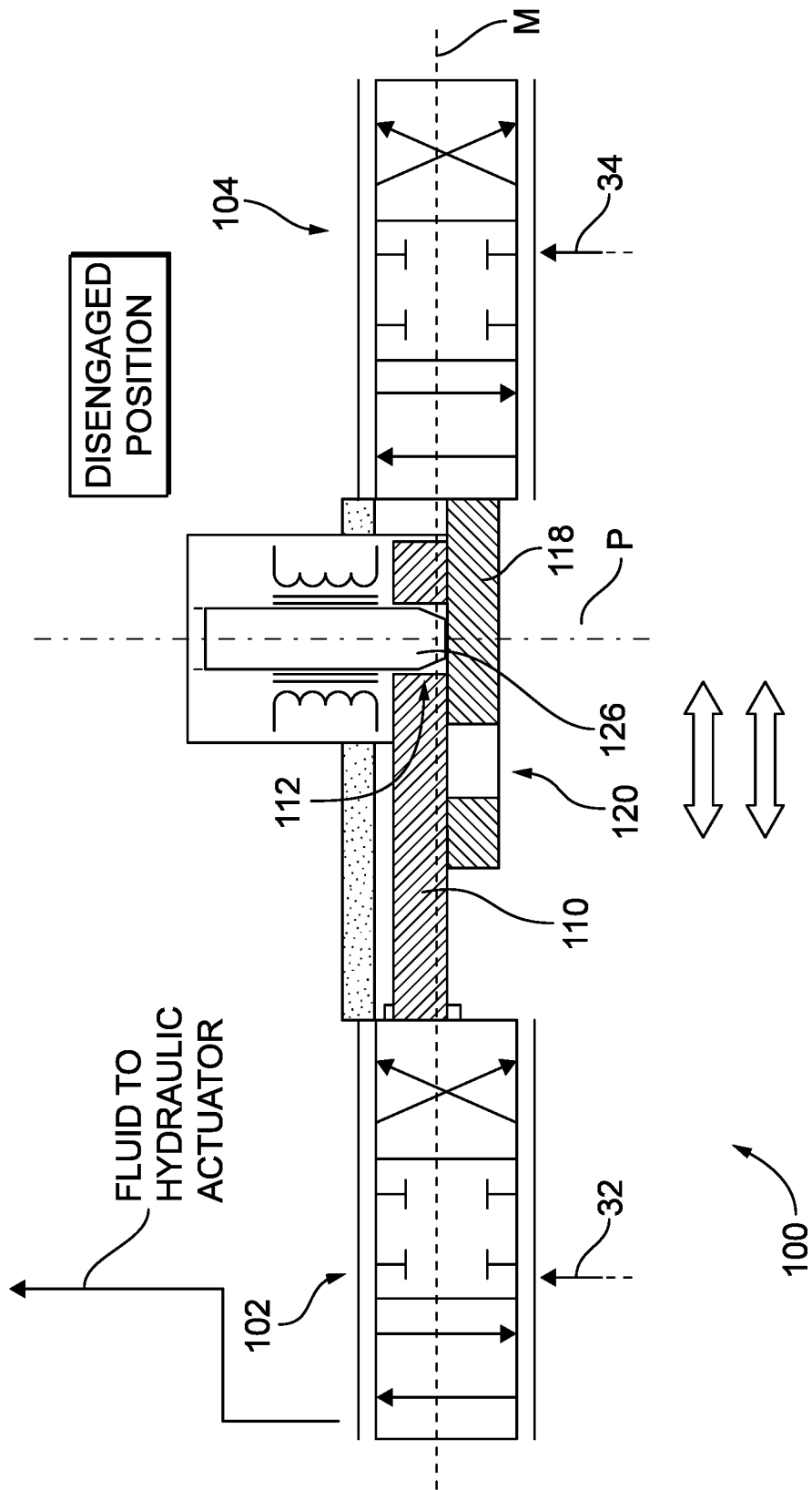
FIG. 4 is a schematic diagram of control valve assembly of FIG. 1, showing a tandem pin seated in a disengaged position and for independent operation of the control valves.

With reference to FIG. 4, tandem pin 126 is shown in the disengaged position. In the disengaged position tandem pin 126 is displaced axially along pin axis P such that tandem pin 126 is outside of second flange aperture 120. When outside second flange aperture 120 first flange 110 and second flange 118 are decoupled from one another. Decoupling first flange 110 from second flange 118 allows either or both of first flange 110 and second flange 118 to move along movement axis M independent of movement (and position) of the other, indicated by the arrows appearing in FIG. 4. As will be appreciated by those of skill in the art in view of the present disclosure, independent movement of first flange 110 and second flange 118 allows either control valve, i.e. first control valve 102 or second control valve 104, to provide pressurized hydraulic fluid to multi-stage hydraulic actuator 30 (shown in FIG. 2), thereby providing redundancy. In this respect, upon recognition of a fault in either primary hydraulic system 32 or secondary hydraulic system 34, application of current to solenoid or linear motor 124 withdraws tandem pin 126 from second flange aperture 120 to enable either first control valve 102 or second control valve 104 to continue to provide pressurized fluid to multi-stage hydraulic actuator 30.

Hydraulic actuators with more than one power stage and controlled by electrohydraulic servo valves can be prone to force fights. Force fights can occur due to manufacturing differences between the servo valves and/or due to phase delays in control signals applied to the servo valves. The tendency of such valves to enter into force fight cycles can be overcome by adding structural margin to the servo valves and hydraulic actuators that they control, incorporating pressure sensors in the valve chambers to detect and compensate upon detection of a pressure differential onset between the valves, and/or control algorithms.

In embodiments described herein hydraulic control valves plumbed independently to one stage of a multistage hydraulic actuator, which may have two, three, or more than three stages. The spools of both (or more than two) control valves have a flange that is fixed relative to the respective spool and have a through-hole extending through the flange, which may be match cut with the spools positioned relative to one another such that each is flow matched to the other. A solenoid or linear motor operably connected to a triple channel tandem pin is carried by a rail fixed relative to the control valve bodies and translates along the rail according to movement of either or both control valve flanges. In normal operation the tandem pin is in an engaged position extending through both flange apertures such that both control valves are mechanically linked to one another during dual stage operation, synchronizing movement of the control valve spools such that force fights are unlikely (or impossible). In the event that either control valve is unavailable, the solenoid or linear motor displaces the tandem pin to the disengaged position allowing one of the control valves to provide pressurized fluid to the hydraulic actuator. This allows for a relatively lightweight control valve and actuator assemblies, mitigates force fight loading in hydraulic systems incorporating such control valve assemblies, and reduces reliance of pressure sensor arrays to detect and respond to force fight events.

The methods and systems of the present disclosure, as described above and shown in the drawings, provide for hydraulic actuator control valves with superior properties including reduced size, reduced risk due to mitigated force fight loading, improved reliability, and/or improved safety. It is contemplated that hydraulic actuator control valves can provide relatively lightweight, redundant hydraulic flight control actuators. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A control valve for a hydraulic actuator, comprising:
a valve body defining a translation axis;
a spool disposed within the valve body and movable along the translation axis;
a flange connected to the spool and having an aperture disposed externally of the valve body, wherein the flange is fixed relative to the spool and configured to removably fix the spool to a spool of a redundant control valve that is independently connected to a multi-stage hydraulic actuator;
a tandem pin defining a pin axis and slidably seated in the flange aperture, the tandem pin slidable between a first position, in which the spool and the redundant control valve spool are engaged, and a second position, in which the spool and the redundant control valve spool are disengaged.

2. A control valve as recited in claim 1, wherein the spool and the flange are integrally connected to one another in a unitary structure.

3. A control valve as recited in claim 1, wherein the control valve is an infinitely variable directional valve.

4. A control valve as recited in claim 1, wherein the aperture is a through hole.

5. A control valve as recited in claim 1, wherein the pin axis is angled relative to the translation axis.

6. A control valve assembly as recited in claim 1, further including a solenoid or linear motor coupled to the tandem pin and configured to displace the tandem pin along the pin axis.

7. A control valve as recited in claim 1, further including a rail fixed relative to the valve body and extending along the translation axis, wherein the pin is coupled to the rail and translatable relative to the rail and along the translation axis.

8. A control valve as recited in claim 1, wherein the spool is a first spool wherein the spool of the redundant control valve is a second spool disposed along the translation axis, wherein a flange of the second spool overlaps the first spool flange along the translation axis.

9. A control valve as recited in claim 8, wherein the second spool flange defines an aperture wherein the tandem pin is fixed relative to both the first flange and the second flange in the first position.

10. A control valve as recited in claim 8, wherein the second spool flange defines an aperture wherein the tandem pin is fixed to only one of the first flange and the second flange in the second position.

11. A control valve as recited in claim 8, wherein the first flange is interposed between the first spool and the second spool along the translation axis.

12. A control valve as recited in claim 8, wherein the second flange is interposed between the first spool and the second spool along the translation axis.

13. A hydraulic actuator assembly, comprising:
a multi-stage hydraulic actuator;
a control valve assembly having first and second control valves in fluid communication with the hydraulic actuator through independent fluid conduits, each of the first and second control valves comprising:
a valve body defining a translation axis;
a spool disposed within the valve body and movable along the translation axis;
a flange connected to the spool and having an aperture disposed externally of the valve body, wherein the flange is fixed relative to the spool, and
a tandem pin slidably seated in at least one of the aperture of the first control valve flange and the aperture of the second control valve flange wherein the tandem pin is slidable between a first position, in which the first spool and the second spool are engaged, and a second position, in which the first spool and the second spool are disengaged.

14. A hydraulic actuator assembly as recited in claim 13, wherein in the first position the tandem pin fixes the flanges relative to one another in an engaged position and in the second position the tandem pin is fixed to one of the flanges in a disengaged position.

15. A hydraulic actuator assembly as recited in claim 13, further including a rail fixed relative to the first valve body and the second valve body and extending along the translation axis, wherein the tandem pin is coupled to the rail and translatable relative to the rail and along the translation axis.

16. A hydraulic actuator assembly as recited in claim 13, wherein the first control valve and the second control valve are infinitely variable directional valves.

17. A hydraulic actuator assembly as recited in claim 13, further including a solenoid or linear motor coupled to the tandem pin and configured to displace the tandem pin along a pin axis between the first position and the second position.

18. A hydraulic actuator assembly as recited in claim 13, wherein the apertures defined by the first control valve flange and the second control valve flange are through-holes.

19. A rotorcraft, comprising:
a flight control device;
a multi-stage hydraulic actuator operably connected to the flight control device;
a control valve assembly having first and second control valves in fluid communication with the hydraulic actuator through independent fluid conduits, each of the first and second control valves comprising:
a valve body defining a translation axis;
a spool disposed within the valve body and movable along the translation axis; and
a flange connected to the spool and having an aperture disposed externally of the valve body, wherein each of the flanges is fixed relative to the respective spool and configured to removably fix the first spool to the second spool,
wherein the valve body of the first control valve is fixed relative to the valve body of the second control valve, wherein the flange of the first control valve overlaps the flange of the second control valve between the first valve body and the second valve body;
a tandem pin defining a pin axis and slidably seated in at least one of the aperture of the first control valve flange and the aperture of the second control valve flange, wherein the tandem pin is slidable between a first position, in which the first spool and the second spool are engaged, and a second position, in which the first spool and the second spool are disengaged.

20. A rotorcraft as recited in claim 19, further including a solenoid or linear motor electromagnetically coupled to the tandem pin and configured to displace the tandem pin along the pin axis between the first position and the second position.

* * * * *